United States Patent
Williams et al.

(10) Patent No.: US 9,682,341 B2
(45) Date of Patent: Jun. 20, 2017

(54) AIR FILTER

(75) Inventors: Steve Williams, Beaumont, CA (US); Jere James Wall, Helendale, CA (US)

(73) Assignee: K&N Engineering, Inc., Riverside, CA (US)

(*) Notice: Subject to any disclaimer, the term of this patent is extended or adjusted under 35 U.S.C. 154(b) by 0 days.

(21) Appl. No.: 13/460,518

(22) Filed: Apr. 30, 2012

(65) Prior Publication Data

US 2013/0283743 A1   Oct. 31, 2013

(51) Int. Cl.

| | |
|---|---|
| B01D 39/00 | (2006.01) |
| B01D 46/00 | (2006.01) |
| B01D 47/00 | (2006.01) |
| B01D 53/00 | (2006.01) |
| B01D 46/10 | (2006.01) |
| B01D 46/12 | (2006.01) |
| B01D 46/52 | (2006.01) |

(52) U.S. Cl.
CPC ......... *B01D 46/103* (2013.01); *B01D 46/125* (2013.01); *B01D 46/521* (2013.01)

(58) Field of Classification Search
CPC .... B01D 46/10; B01D 46/521; B01D 46/523; B01D 46/0005; B01D 29/07; B01D 46/0002; B01D 46/0016; Y10D 55/31
USPC ........... 55/497, 484, 502, 521, 524; 96/154; 69/154; 10/497, 484, 502, 521; 95/154
See application file for complete search history.

(56) References Cited

U.S. PATENT DOCUMENTS

| | | | | |
|---|---|---|---|---|
| 5,679,122 A * | 10/1997 | Moll et al. | | 55/497 |
| 6,447,566 B1 * | 9/2002 | Rivera et al. | | 55/482 |
| D677,370 S * | 3/2013 | Handley et al. | | D23/365 |
| 2008/0017038 A1 * | 1/2008 | Wu | | 96/154 |
| 2009/0142234 A1 * | 6/2009 | Tatarchuk et al. | | 422/122 |
| 2009/0301402 A1 * | 12/2009 | Devine et al. | | 119/447 |
| 2011/0067368 A1 * | 3/2011 | Handley et al. | | 55/486 |
| 2011/0289894 A1 * | 12/2011 | Nicholas | | 55/486 |
| 2011/0308210 A1 * | 12/2011 | Crabtree et al. | | 55/483 |
| 2012/0317940 A1 * | 12/2012 | Ball et al. | | 55/385.2 |

* cited by examiner

*Primary Examiner* — Amber R Orlando
(74) *Attorney, Agent, or Firm* — Rutan & Tucker LLP; Hani Z. Sayed

(57) ABSTRACT

An air filter including a base and a first and second frame element is disclosed. Each frame element is coupled to the base. The frame elements have an oscillating shape having a first portion relatively close to the base and a second portion relatively farther from the base. A filter element generally follows the oscillating shape of the frame elements. An air filter system is also disclosed. The air filter system can include the air filter and an air filter container. The air filter container contains the air filter and directs air through the air filter in a predetermined direction. An air filter is disclosed including a support structure and an oscillating shaped filter element attached to the support structure. The oscillating shape increases the air filter surface area for a given volume.

6 Claims, 4 Drawing Sheets

AIR FILTER

FIELD OF THE INVENTION

The field of the invention is generally related to filter devices. More specifically, the field of the invention is related to air filters.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and in engines.

Air filters may be used in automobiles, trucks, tractors, locomotives and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally the air intakes of internal combustion engines and compressors tend to use either: paper, foam, or cotton filters. Some filters use an oil bath. Air filters for internal combustion engines prevents abrasive particulate matter from entering the engine's cylinders, where it would cause mechanical wear and oil contamination. In many fuel injected engines you may find a flat panel pleated paper filter element. This filter is usually placed inside a plastic box connected to the throttle body with ductwork. Vehicles that use carburetors or throttle body fuel injection typically use a cylindrical air filter positioned above the carburetor or throttle body.

Air filters may also be used to filter cabin air filter, for example, a vehicle such as a car, truck, airplane, bus, train, tractor, etc. These air filters may typically be a pleated-paper filter that brings in outside-air and filters it for the vehicle's passenger compartment. Some of these filters are rectangular and similar in shape to the combustion air filter.

SUMMARY OF THE INVENTION

The present invention provides an air filter. Additionally, the present invention may provide an air filter system and methods of using the air filter.

To this end, the embodiment can be shaped to increase surface area for a given volume.

To this end, in a exemplary embodiment of the present invention, an air filter comprising: a base; a first and second frame element, each frame element coupled to the base and having an oscillating shape having a first portion relatively close to the base and a second portion relatively farther from the base; and a filter element that generally follows the oscillating shape of the frame elements.

In an exemplary embodiment, the frame elements are curved between the first and second portion.

In an exemplary embodiment, wherein the frame elements have a generally sinusoidal shape.

In an exemplary embodiment, the frame elements are the same size and shape.

In an exemplary embodiment, frame elements and the base are formed as a single assembly.

In an exemplary embodiment, the filter element comprises of a pleated paper filter element.

In an exemplary embodiment, further comprising a reinforcing device.

In an exemplary embodiment, reinforcing device comprises a pair of wire screens on opposite sides of the filter element.

In an exemplary embodiment, an air filter system comprising: an air filter including: a base; a first and second frame element, each frame element coupled to the base and having an oscillating shape having a first portion relatively close to the base and a second portion relatively farther from the base; and a filter element that generally follows the oscillating shape of the frame elements; an air filter container, containing the air filter, the air filter container configured to direct air through the air filter in a predetermined direction.

In an exemplary embodiment, the frame elements are curved between the first and second portion.

In an exemplary embodiment, the frame elements have a generally sinusoidal shape.

In an exemplary embodiment, the frame elements are the same size and shape.

In an exemplary embodiment, the frame elements the base and the frame elements are formed as a single assembly.

In an exemplary embodiment, the reinforcing device comprises a pair of wire screens on opposite sides of the filter element.

In an exemplary embodiment, the air filter container directs air through the air filter in a direction perpendicular to a flat base, the air entering from the base side and exiting the filter assembly in a direction through the filter element.

In an exemplary embodiment, the air filter container directs air through an air filter in a direction perpendicular to a flat base, the air entering through the filter element and exiting from the base side.

In an exemplary embodiment, the air filter container flows through the air filter in a direction parallel to a flat base such that air is filtered by the filter element multiple times.

In an exemplary embodiment, wherein the air filter container directs air through an air filter at an angle to a flat base such that air is filtered by the filter element multiple times.

In an exemplary embodiment, an air filter comprising: a support structure; and an oscillating shaped filter element attached to the support structure, the oscillating shape increasing the air filter surface area for a given volume.

In an exemplary embodiment, an example air filter may be curved in an oscillating shape when viewed from the side. As used herein, the phrase "oscillating shape" refers to a generally curved shape that at least one point is generally more near a base and another point is further from the base or, more generally, a curving shape that provides a relatively large surface area in a given volume of the filter. As used herein "oscillating" does not imply movement of the filter.

In an exemplary embodiment, an example air filter may be curved in a generally sinusoidal shape when viewed from the side. For purposes of this application "sinusoidal shape" should not be interpreted to only mean a shape that strictly follows a cosine or sine function, but rather any shape that generally oscillates from a low area to a high area (when viewed from a side of the filter) in a generally curved or circular fashion.

In an exemplary embodiment, an example air filter may have a frame with a flat base and generally sinusoidal shaped frame attached to the generally flat base.

In an exemplary embodiment, an example filter includes a filter element held by a generally sinusoidal shaped frame attached to a generally flat base.

In an exemplary embodiment, an example filter includes a generally flat base that is wider that the rest of the filter assembly, including a generally sinusoidal shaped frame and a filter element held by the frame.

In an exemplary embodiment, an example filter system directs air through an air filter in a direction perpendicular to a flat base, the air entering from the base and exiting the filter assembly in a direction through the filter element.

In an exemplary embodiment, an example filter system directs air through an air filter in a direction perpendicular to a flat base, the air entering through the filter element and exiting from the base.

In an exemplary embodiment, an example filter system directs air through an air filter in a direction parallel to a flat base such that air is filtered by the filter element multiple times.

In an exemplary embodiment, an example filter system directs air through an air filter at an angle to a flat base such that air is filtered by the filter element multiple times.

In an exemplary embodiment, an example air filter further includes a support that holds the filter element against the flow of air. For example, a wire screen may generally follow the contour of the filter and be located on the side of the filter opposite the frame for filters designed to be used in filter systems that directs air through an air filter in a direction perpendicular to a flat base and entering at the base and exiting the filter assembly in a direction through the filter element. The wire screen or other known filter reinforcing device can generally be placed against the filter element opposite the flow of air.

In an exemplary embodiment, the side of the filter element that a filter reinforcing device such as a wire screen is placed on an alternate from side to side to reinforce against air as it flows through a filter multiple times in a direction parallel to the base.

In an exemplary embodiment, a filter reinforcing device such as a wire screen can be placed on both sides of the filter element to allow for different air flow directions.

In an exemplary embodiment, an example air filter may be designed to remove particulate from the air.

In an exemplary embodiment, an example air filter may be composed of fibrous materials that may remove solid particulates such as dust, pollen, mold, and bacteria from the air.

In an exemplary embodiment, an example air filter may be used in applications where air quality is important such as building ventilation systems and engines.

In an exemplary embodiment, an example air filter may be designed to be used in automobiles, trucks, tractors, locomotives and other vehicles that use internal combustion engines.

In an exemplary embodiment, an example air filter may be designed to be used with gasoline engines, diesel engines, or other engines that run on fossil fuels or other combustible substances.

In an exemplary embodiment, an example air filter may be designed to be used with engines in which combustion is intermittent, such as four-stroke and two-stroke piston engines, as well as other types of engines that take in air so that a combustible substance may be burned.

In an exemplary embodiment, an example air filter may be designed to be used with some gas turbines.

In an exemplary embodiment, an example air filter may be designed to be used with air compressors or in other devices that take in air.

In an exemplary embodiment, an example air filter may be designed to be made from pleated paper, foam, cotton, spun fiberglass, or other known filter materials.

In an exemplary embodiment, an example air filter may be designed to prevent abrasive particulate matter from entering the device using the air filter.

In an exemplary embodiment, an example air filter may be a curving panel of a pleated paper filter element.

In an exemplary embodiment, an example air filter may be designed for use to filter cabin air in, for example, a vehicle such as a car, truck, airplane, bus, train, tractor, etc.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

It will be understood that the terms "top," "side," and "bottom" used to describe FIGS. 1-5 are intended to provide a frame of reference for purposes of describing embodiments of the air filter. The actual orientation of the air filter in use and the direction of air flow may vary.

DETAILED DESCRIPTION OF THE EMBODIMENTS

In the following description of preferred embodiments, reference is made to the accompanying drawings which form a part hereof, and in which it is shown by way of illustration of specific embodiments in which the invention can be practiced. It is to be understood that other embodiments can be used and structural changes can be made without departing from the scope of the embodiments of this invention.

Although embodiments of the invention may be described and illustrated herein in terms of a single example air filter, it should be understood that embodiments of this invention are not limited to the exact shape illustrated, but rather, include a wide variety of generally curved shapes, generally sinusoidal shapes, or generally curving shapes that provides a relatively large surface area in a given volume of the filter.

An air filter including a base and a first and second frame element is disclosed. Each frame element is coupled to the base. The frame elements have an oscillating shape having a first portion relatively close to the base and a second portion relatively farther from the base. A filter element generally follows the oscillating shape of the frame elements. An air filter system is also disclosed. The air filter system can include an air filter and an air filter container. The air filter container contains the air filter and directs air through the air filter in a predetermined direction. An air filter is disclosed including a support structure and an oscillating shaped filter element attached to the support structure. The oscillating shape provides for an increased air filter surface area for a given volume.

Figure 1:
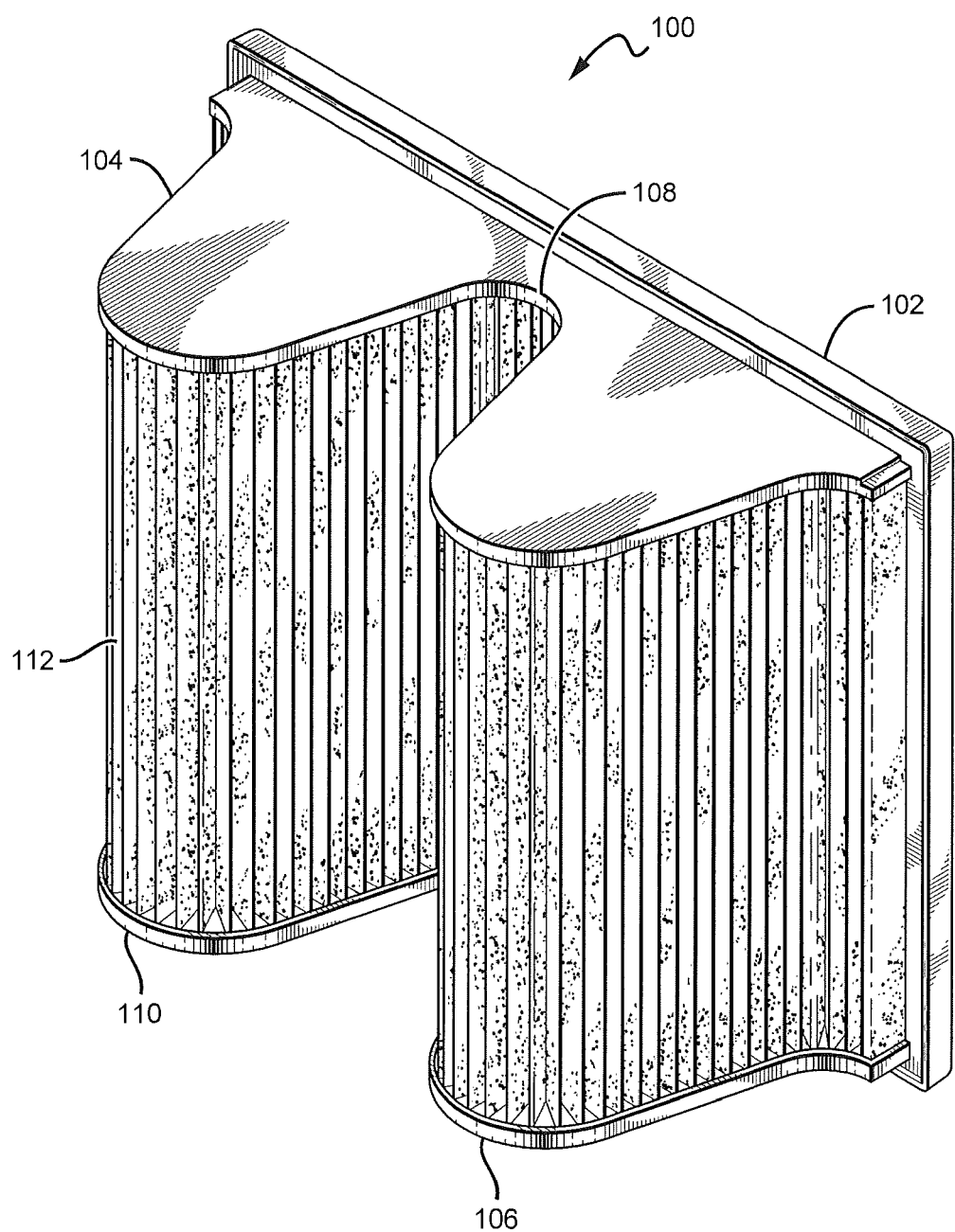
FIG. 1 is a perspective view of a filter in accordance with an exemplary embodiment.

FIG. 1 is a perspective view of a filter 100 in accordance with an exemplary embodiment of the systems and methods described herein. The air filter 100 includes a base 102 which may be a generally straight, flat portion of the filter. It will be understood, however, that other shapes for the base 100 are possible. For example, in another embodiment, a base might generally follow the curvature of the frame.

Filter 100 further includes a first frame element 104 and a second frame element 106. Each frame element 104, 106 is coupled to the base 102. As illustrated in FIG. 1, the frame elements 104, 106 each have an oscillating shape having first portions 108 relatively close to the base and second portions 110 relatively farther from the base. The frame elements 104, 106 are curved between the first and second portion. For example, the frame elements can have a generally sinusoidal shape. Additionally, the frame elements 104, 106 may generally be the same size and shape as illustrated in FIG. 1. In another embodiment, the frame elements 104, 106 and the base 102 are formed as a single assembly.

Filter 100 also includes a filter element 112 that generally follows the oscillating shape of the frame elements 104, 106. Filter 100 can further include a reinforcing device such as a wire screen. A pair of wire screens on opposite sides of the filter element 112 might be used in some embodiments, to allow for airflows in a variety of directions using the same filter. Other embodiments might include a reinforcing device designed for a specific air flow. The filter element 112 can include a pleated paper filter element or other filter materials, such as foam, cotton, spun fiberglass, other known filter materials, or combinations of such materials.

Figure 2:
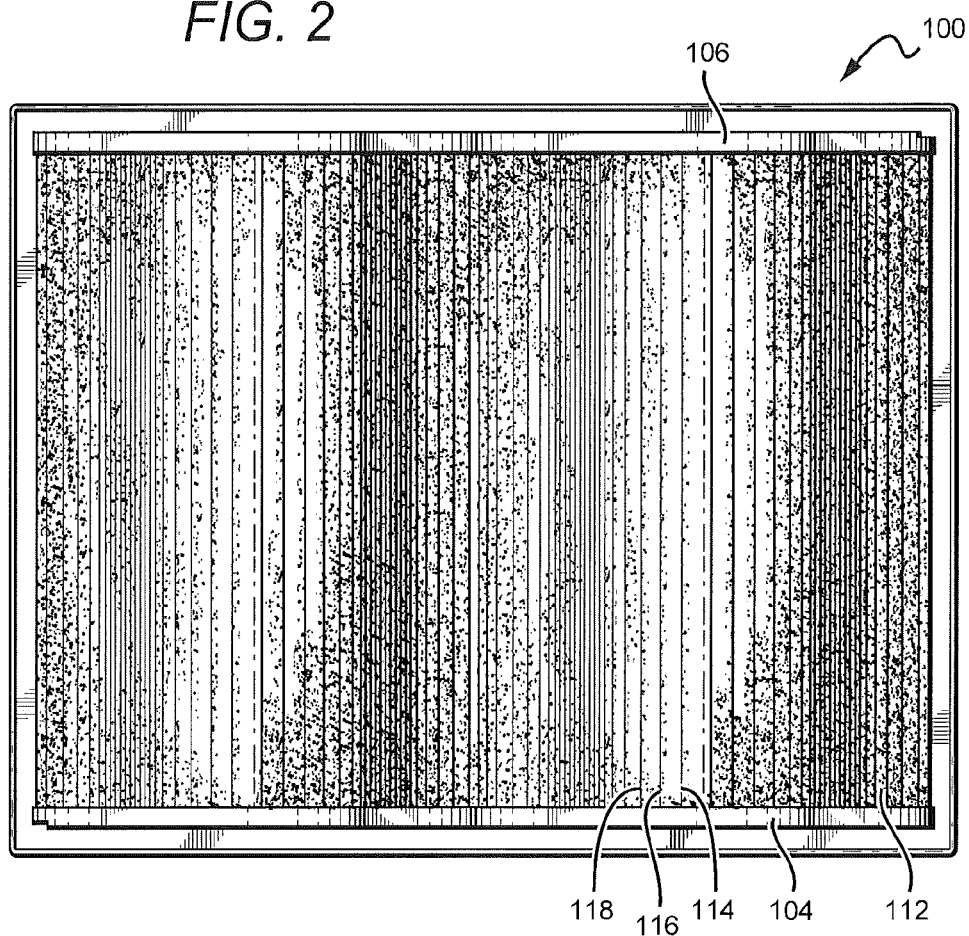
FIG. 2 is a top view of a filter in accordance with an exemplary embodiment.

FIG. 2 is a top view of a filter 100 in accordance with an exemplary embodiment. The view illustrates pleats 114, 116, 118 in the filter material 112. Frame elements 104, 106 are also illustrated. In an exemplary embodiment, an example air filter may be curved in an oscillating shape when viewed from the side. An example air filter may be curved in a generally sinusoidal shape when viewed from the side. Additionally, an example air filter may have a frame with a flat base and generally sinusoidal shaped frame attached to the generally flat base. A filter can include a filter element held by a generally sinusoidal shaped frame attached to a generally flat base.

Figure 3:
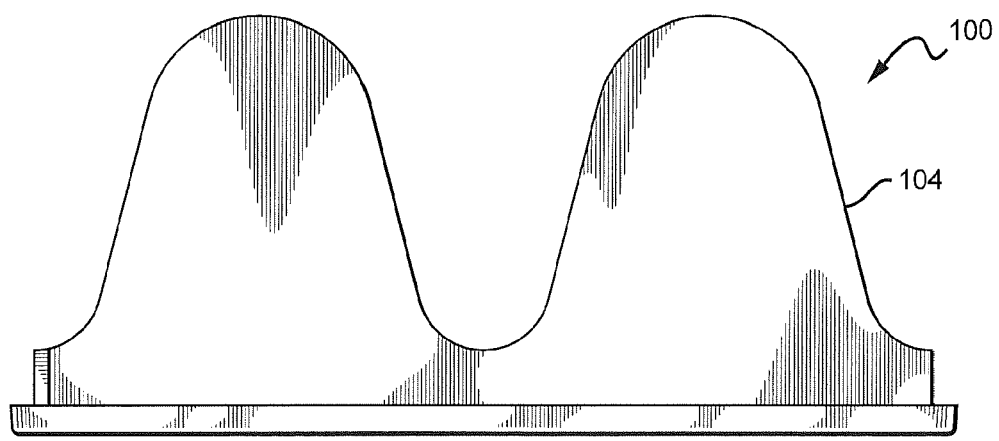
FIG. 3 is a frame side view of a filter in accordance with an exemplary embodiment.

FIG. 3 is a frame side view of a filter 100 in accordance with an exemplary embodiment. As illustrated the frame elements 104, 106 of filter 100 may be curved in an oscillating shape when viewed from the side. As used herein, the phrase "oscillating shape" refers to a generally curved shape that at least one point is generally more near a base and at another point is further from the base or, more generally, a generally curving shape that provides a relatively large surface area in a given volume of the filter. As used herein "oscillating" does not imply movement of the filter.

In an exemplary embodiment, an example air filter may be curved in a generally sinusoidal shape when viewed from the side. For purposes of this application "sinusoidal shape" should not be interpreted to only mean a shape that strictly follows a cosine or sine function, but rather any shape that generally oscillates from a low area to a high area (when viewed from a side of the filter) in a generally curved or circular fashion.

Figure 4:
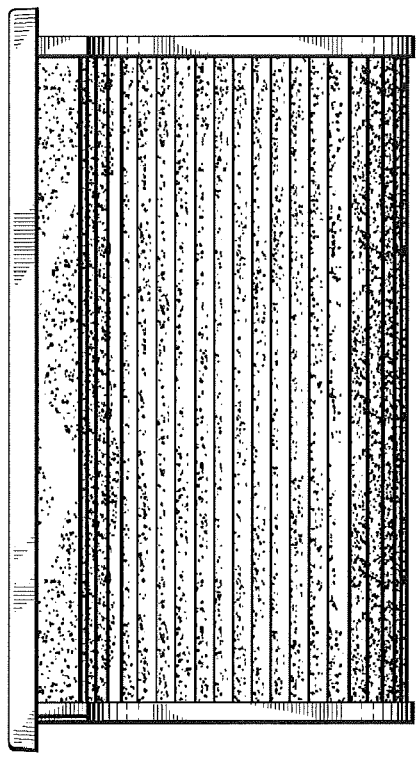
FIG. 4 is a filter element side view of a filter in accordance with an exemplary embodiment.
Figure 5:
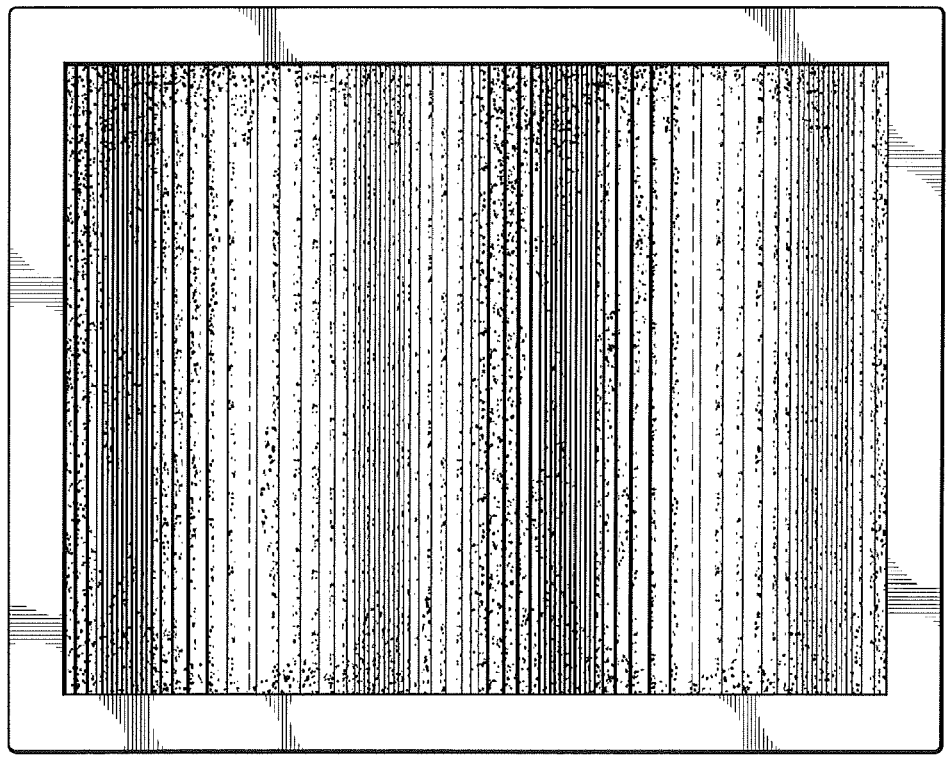
FIG. 5 is a bottom view of a filter in accordance with an exemplary embodiment.

FIG. 4 is a filter element 112 side view of a filter 100 in accordance with an exemplary embodiment. FIG. 5 is a bottom view of a filter 100 in accordance with an exemplary embodiment. Note that the base 102 is open to allow for air flow.

Figure 6:
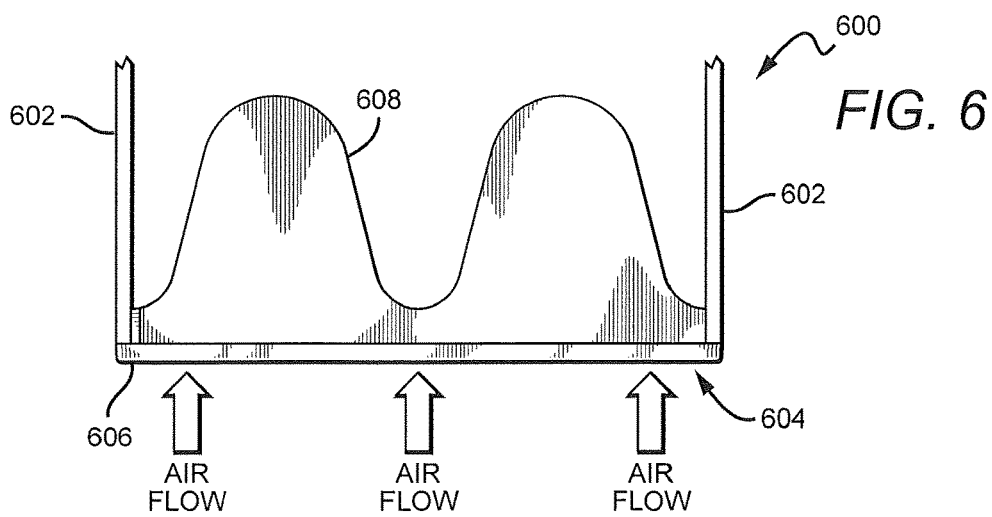
FIG. 6 is a frame side view of a filter system in accordance with an exemplary embodiment.

FIG. 6 is a frame side view of a filter system 600 in accordance with an exemplary embodiment. An air filter system can include an air filter 604 as described with respect to FIGS. 1-5. The filter system 600 can also include an air filter container 602, containing the air filter 604. The air filter container 602 is configured to direct air through the air filter in a predetermined direction. For example, as illustrated in FIG. 6, the system 600 directs air through an air filter 604 in a direction perpendicular to a flat base 606, the air entering from the base 606 side and exiting the filter assembly in a direction through the filter element 608.

Figure 7:
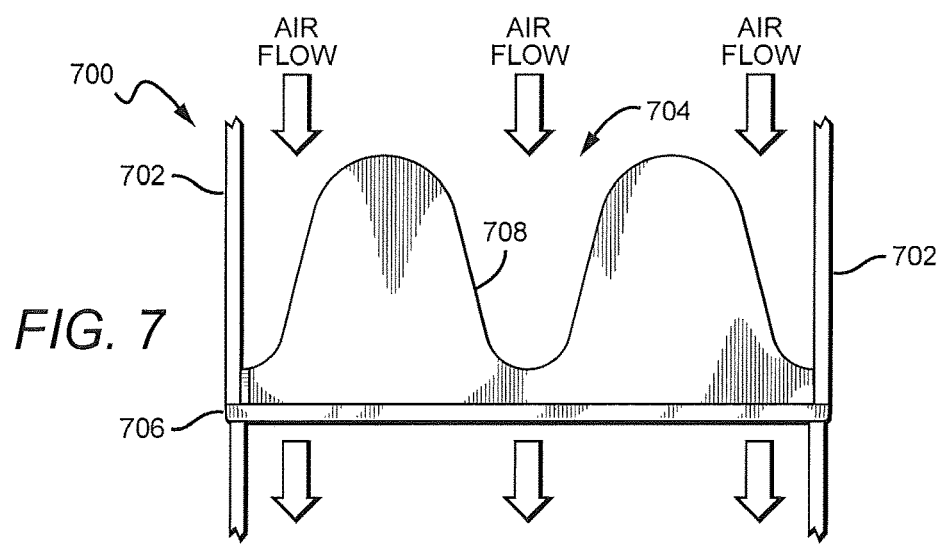
FIG. 7 is a frame side view of a filter system in accordance with an exemplary embodiment.

FIG. 7 is a frame side view of a filter system 700 in accordance with an exemplary embodiment. In the illustrated embodiment, an air filter container 702 directs air through an air filter 704 in a direction perpendicular to a flat base 706. The air enters through the filter element 708 and exiting through base 706 side.

Figure 8:
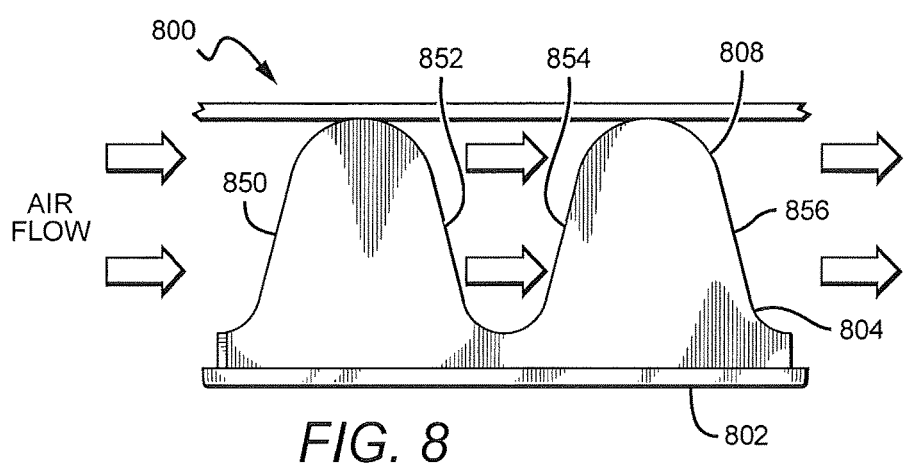
FIG. 8 is a frame side view of a filter system in accordance with an exemplary embodiment.

FIG. 8 is a frame side view of a filter system 800 in accordance with an exemplary embodiment. As illustrated, the air filter assembly 800 includes a container 802 that directs air through the air filter 804 in a direction parallel to a flat base 802 such that air is filtered by the filter element 808 multiple times.

A system using a set up that filters the air multiple times may be useful in applications where air quality is important such as building ventilation systems and engines. In an exemplary embodiment, an example air filter may be designed to be used in automobiles, trucks, tractors, locomotives and other vehicles that use internal combustion engines. In an exemplary embodiment, an example air filter may be designed for use to filter cabin air, for example, a vehicle such as a car, truck, airplane, bus, train, tractor, etc.

For example, an air filter may be designed to be used with gasoline engines, diesel engines, or other engines that run on fossil fuels or other combustible substances. Another example air filter may be designed to be used with engines in which combustion is intermittent, such as four-stroke and two-stroke piston engines, as well as other types of engines that take in air so that a combustible substance may be burned. The systems and methods described herein might be applied for use with some gas turbines, air compressors, or in other devices that take in air. The systems and methods can be designed to prevent abrasive particulate matter from entering the device using the air filter. In an exemplary embodiment, an example air filter may be a curving panel of a pleated paper filter element. Other filters may use different materials or combinations of materials.

As discussed herein, the air filter system may further include a reinforcing device such as a wire screen. For example, the reinforcing device may include a pair of wire screens on opposite sides of the filter element to allow the air filter to operate with air flows in a variety of directions. It will be understood that the reinforcing device can generally be placed on a side where the air exits the filter material. For example, referring back to FIG. 6, the reinforcing device (e.g., wire screen) can be on the same side as reference character 600. As another example, referring back to FIG. 7, the reinforcing device (e.g., wire screen) can be on the opposite side as reference character 700. As can be seen by observing the air flow in FIG. 8, it might be advantageous to use a reinforcing device (e.g., wire screen) on both sides.

Alternatively, reinforcing devices might alternate from side to side, generally being located around 850, 852, 854, and 856.

As illustrated in FIGS. 6 and 7 the air filter containers 602, 702 direct air through the air filters 604, 704 in a direction perpendicular to a flat base. FIG. 8 illustrates a container 802 that directs air through the air filter 804 in a direction parallel to a flat base 802. It will be understood, however, that filter containers may be configured to provide for a variety of air flow angles for use with various embodiments of the air filters described herein. For example, another embodiment may include an air filter container that directs air through an air filter at an angle to a flat base such that air is filtered by the filter element multiple times.

In an embodiment of the systems and methods described herein an air filter can include a support structure and an oscillating shaped filter element attached to the support structure, the oscillating shape increases the air filter surface area for a given volume. Referring back to FIG. 1, a support structure might include a base 102 and frame elements 104, 106 with filter element 112 attached. It will be understood, however, that a wide variety of support structures might be used to provide support for the filter element.

Embodiments provide an air filter. Additionally, other embodiments may provide an air filter system and methods of using the air filter. In an example method air might be directed through an air filter shaped to increase surface area for a given volume. The air might be directed perpendicular to the base of the air filter, parallel to the base of the air filter, or some angle in between.

In an exemplary embodiment, an example filter includes a generally flat base that is wider that the rest of the filter assembly, including a generally sinusoidal shaped frame and a filter element held by the frame.

It will be understood that the terms "top," "side," and "bottom" used to describe FIGS. 1-5 are intended to provide a frame of reference for purposes of describing embodiments of the air filter. The actual orientation of the air filter in use and the direction of air flow may vary.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

Thus, specific embodiments and applications of modular overhead storage have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C, . . . and N, the text should be interpreted as requiring only one element from the group, not A plus N, or B plus N, etc.

We claim:

1. An air filter comprising:
    a support structure including a flat base whereby the base is open to allow air flow;
    a first and second frame element, each frame element coupled to the flat base and comprising having a generally sinusoidal shape having a curved first portion relatively close to the base and a second curved portion extending away from the base wherein the base is open to allow for air flow therethrough, further wherein the second curved portion is larger than the curved first portion;
    an air filter container including a first side and a second side and configured to direct air through the filter element in a predetermined direction; and
    a filter element having a top portion and a bottom portion, the filter element following the generally sinusoidal shape of the first and second frame elements, the first filter element being pleated and wherein the filter element further includes a reinforcing device to allow for airflow in a variety of different directions using the filter,
    wherein the first side of the air filter container is located at the base of the supporting structure and the second side of the air filter container is located at a peak of the air filter element, and the filter element and the support structure have an oscillating shape.

2. The air filter of claim 1, wherein the first and second frame elements are curved between the first and second portion.

3. The air filter of claim 1, wherein the first and second frame elements are a same size and shape.

4. The air filter of claim 1, wherein the first and second frame elements and the base are formed as a single assembly.

5. The air filter of claim 1, wherein the filter element comprises of a pleated paper filter element.

6. The air filter of claim 1, wherein the reinforcing device comprises a pair of wire screens on opposite sides of the filter element.

* * * * *